United States Patent Office 3,519,446
Patented July 7, 1970

3,519,446
CERAMIC MATERIAL
John A. Earl, Alhambra, Calif., assignor, by mesne assignments, to Physical Sciences Corporation, Los Angeles, Calif., a corporation of California
No Drawing. Continuation of application Ser. No. 288,440, June 17, 1963. This application Sept. 19, 1968, Ser. No. 764,021
Int. Cl. C03c 3/10
U.S. Cl. 106—53         3 Claims

ABSTRACT OF THE DISCLOSURE

Hermetic seal provided by two frits, viz K-Pb-As-Al-$SiO_2$ and Na-Al-B-Ti-$SiO_2$; and optionally containing oxides of Li and Co.

This application is a continuation of my copending application, Ser. No. 288,440, filed June 17, 1963, and now abandoned.

This invention relates to a ceramic material for providing a hermetic seal and particularly to a ceramic material for providing a hermetic seal through an extended range of temperatures. The ceramic material is adapted to provide a hermetic seal with the oxides of certain metals, such as iron, nickel and chromium, and is particularly adapted to provide a hermetic seal with stainless steel of the 400 series. The invention also relates to methods of producing the novel ceramic material included in this invention.

As the scientific age progresses, it becomes increasingly important to provide measuring equipment which can operate with considerable accuracy. One way of providing such accuracies is to provide measurements at relatively low pressures approaching complete vacuums. This requires that leak type arrangements be provided to ensure that any vacuums produced shall be maintained with continued operation of the measuring equipment. Such leak type arrangements often have to be maintained with considerable variations in temperature such as between approximately 70° F. and 1,000° F.

Considerable effort has been devoted in the past to provide a ceramic material which will produce a hermetic seal with the oxides of various metals such as the oxides of iron, nickel and chromium and such as stainless steel of the 400 series and which will maintain these hermetic seals through an extended range of temperatures to temperatures as high as 1,000° F. Such efforts have not been entirely satisfactory since it has been difficult to provide ceramic materials which expand through the extended temperature range in substantially the same manner as the metals to which they adhere. The problems have been compounded when the hermetic seal has been made to relatively thin members, such as connector pins.

This invention provides a ceramic material which overcomes the above disadvantages. The material is able to be bonded to oxides of the various metals, such as the oxides of iron, nickel and chromium, and stainless steel, preferably of the 400 series, and used through an extended range of temperatures as high as 1,000° F. The ceramic material constituting this invention is also able to be bonded to relatively thin members such as connector pins to provide a hermetic seal with the pins through the extended range of temperatures. For example, the ceramic material constituting this invention provides a hermetic seal of $1 \times 10^{-10}$ cubic centimeters of helium per second at approximately room temperature of 70° and through an extended range of temperatures to a temperature of approximately 1,000° F.

Various materials capable of being used in forming ceramics may be generally divided as follows into three groups or categories:

TABLE I

Glass modifiers:
  Lithium oxide ($Li_2O$)
  Sodium oxide ($Na_2O$)
  Potassium oxide ($K_2O$)
  Lead oxide (PbO)
  Zinc oxide (ZnO)
  Strontium oxide (SrO)
  Barium oxide (BaO)
  Calcium oxide (CaO)
  Magnesium oxide (MgO)

Glass formers:
  Arsenic oxide ($As_2O_3$)
  Boron oxide ($B_2O_3$)
  Bismuch oxide ($Bi_2O_3$)
  Aluminum oxide ($Al_2O_3$)
  Lanthanum oxide ($La_2O_3$)

Glass acid:
  Silicon dioxide ($SiO_2$)
  Cerium dioxide ($CeO_2$)
  Zirconium dioxide ($ZrO_2$)
  Titanium dioxide ($TiO_2$)
  Molybdenum trioxide ($MoO_3$)

It will be appreciated that the listing of some of the materials in Table I may be considered as somewhat arbitrary since these materials may be considered by some people as belonging in a different one of the lists than set forth in Table I. However, the listing of the materials as set forth in Table I would be considered as proper by many of the experts in the art. It will also be appreciated that other materials may also be included in each of the different categories. For example, the oxides of copper and silver may be included in the first category designated as the glass modifiers. These additional materials have not been included because they have low electrical resistivities and because at least some of these materials will even act as electrical conductors in colloidal solutions.

The glass modifiers may in general be considered as having alkaline properties and the properties of a base. The glass modifiers may be further considered as having a chemical formula which may be designated as $R_2O$ or RO, where R indicates the element forming the compound with the oxygen (O). The alkalinity of the element in combination with oxygen in the glass modifying category or group tends to decrease progressively down the list, as does the reactivity of the compound with an acid. The electrical resistivity of the material at any particular temperature tends to increase progressively down the list. The melting temperature of the compounds in the glass modifiers tends to increase progressively down the list. No definite pattern as to the thermal coefficient of expansion of the oxides in the first category occurs with progressive listings in this category.

The third category or group may be considered as glasses and as having acidic properties. The chemical formula of these glasses may be expressed as $RO_2$ or $RO_3$, where R is the element forming the glass compound with the oxygen. The melting temperatures of the different oxides included in the third category or group tend to increase progressively down the list although the melting temperature of all the oxides in the third category are relatively high. The reactivity of the different oxides in the third category with acids tends to increase progressively down the list. No definite pattern as to the thermal coefficient of expansion of the oxides in the third category occurs with progressive listings in the category.

The second category or group of compounds may be designated as glass formers in that the compounds in the second category tend to react with the compounds in the third category to form the ceramic materials. The compounds in the second category or group may be designated by the chemical formula $R_2O_3$, where R indicates the element forming the compound with the oxygen. The glass formers are intermediate in chemical and physical properties to the glass modifiers and to the glasses. For example, the glass formers may react chemically with either acidic or alkaline materials. The acid resistivity of the different oxides in the second category tends to increase progressively down the list, as does the melting temperature of the different oxides in this category. No definite pattern tends to exist as to the thermal coefficient of expansion of the different oxides listed progressively in the second category.

The ceramics constituting this invention are formed by combining materials from each of the three categories set forth above. The particular materials used and the properties of such materials are dependent upon the characteristics desired for the ceramics to be produced from the materials. For example, such characteristics as the melting temperature of the ceramic, the acid resistance of the ceramic, the thermal coefficient of expansion of the ceramic for different temperatures and the electrical resistivity of the ceramic at different temperatures may be controlled by varying the particular materials used and by varying the proportions of such materials. Although the ceramics constituting this invention may be used as glasses, they can also be used as coatings or glazes and designated as "enamels."

The ceramic coating constituting this invention is formed by a pair of fluxes each having a different melting temperature. As will be seen from Table II, flux A is formed from glass modifiers including the oxides or carbonates of lithium, potassium, lead and cobalt, glass formers including the oxides of aluminum and arsenic and the oxide of silicon as the glass. Flux A is produced by intimately mixing particles of the different materials in the flux and by smelting the mixture in a covered crucible at a temperature of approximately 1800° F. The mixture is then quenched as in water and is ground into fine particles having a size in the order of 400 mesh.

Flux A may be produced by mixing the following materials in the percentages indicated below:

TABLE II

| Material: | Relative percentage by weight |
|---|---|
| Lithium carbonate ($Li_2CO_3$) | 0.74 |
| Potassium carbonate ($K_2CO_3$) | 7.26 |
| Red lead ($Pb_3O_4$) | 31.00 |
| Arsenic trioxide | 10.12 |
| Aluminum trioxide | 0.78 |
| Silicon dioxide | 49.00 |
| Cobalt oxide | 1.10 |

The various materials are included in flux A in the specified percentages for certain important reasons. The carbonates of potassium and lithium are included in flux A to provide the flux with a relatively low melting temperature. For example, flux A melts at a temperature in the order of aproximately 1100° F. The oxides of lithium and potassium are also included to provide flux A with relatively soft properties so that the ceramic material including flux A will start to soften at relatively low temperatures and grip the oxide of the metal which it will hermetically seal. The oxides of lithium and potassium are also included to provide a relatively high thermal coefficient of expansion for the ceramic material constituting this invention. A high coefficient of expansion is desirable when the material is bonded to certain metals such as stainless steel of the 400 series since such stainless steel has a relatively high coefficient of expansion. Such a high coefficient of expansion is especially desirable when the metal to be sealed has a relatively small thickness such as occurs when the metal is in the form of a pin for an electrical connector.

The oxide of cobalt is included as one of the glass modifiers to enhance the adherence of the ceramic material including flux A to various metals such as stainless steel. The oxide of cobalt creates a chemical bond with the oxides of iron, nickel and cobalt and with such metals as stainless steel to enhance the tendency of the ceramic material to produce a hermetic seal with the stainless steel. The oxide of cobalt has a relatively low melting temperature and a medium coefficient of expansion.

The oxide of lead is included as the primary glass modifier because it has good properties of flexibility. Furthermore, the oxide of lead has a relatively low melting temperature. Because of this, the oxide of lead tends to reduce the melting temperature of flux A especially since the oxide of lead constitutes the predominant material in flux A by weight. The oxide of lead may also be considered as advantageous in that it has a relatively high electrical resistivity.

The oxide of aluminum is advantageous as a glass former since it tends to make the material relatively stiff and accordingly extends the range of temperatures at which the ceramic material provides a hermetic seal. The oxide of aluminum also tends to inhibit somewhat the rate at which flux A melts at its melting temperature. This is desirable if the temperature of flux A should be raised inadvertently to the melting temperature after it has been formed. The oxide of aluminum is also advantageous because it tends to enhance the viscosity of the ceramic material constituting this invention. As previously described, a ceramic having an enhanced viscosity is desirable in obtaining a hermetic or vacuum seal with respect to a metallic member such as an electrical terminal, especially when the electrical terminal has a relatively small diameter. The oxide of aluminum also tends to reduce the solubility in water of the ceramic material constituting this invention. This is desirable since the oxides of lithium, sodium and potassium tend to dissolve in water.

The oxide of arsenic is included as arsenous oxide ($As_2O_3$) in flux A to reduce the melting temperature of flux A and to increase the thermal coefficient of expansion of the ceramic material constituting this invention. Arsenic oxide ($As_2O_5$) or arsenous acid ($AsH_3O$) may also be used in place of arsenous oxide. The oxide of silicon generally constitutes one of the basic compounds of ceramic materials. As will be seen, it is the only compound in flux A from the group designated as glasses.

When the materials indicated in Table II are smelted, the lithium carbonate and potassium carbonate become respectively converted to lithium oxide ($Li_2O$) and potassium oxide ($K_2O$) by the liberation of carbon dioxide. The red lead ($Pb_3O_4$) becomes converted to lead oxide (PbO) by the liberation of oxygen during the smelting operation. The black cobalt oxide ($Co_3O_4$) also becomes converted to cobalt oxide (CoO) by the liberation of oxygen during the smelting operation. This causes flux A to have the relative composition indicated below in Table III.

TABLE III

| Material: | Relative percentage by weight |
|---|---|
| Lithium oxide ($Li_2O$) | 0.30 |
| Potassium oxide ($K_2O$) | 5.10 |
| Lead oxide (PbO) | 31.90 |
| Arsenic trioxide ($As_2O_3$) | 10.40 |
| Aluminum trioxide ($Al_2O_3$) | 0.80 |
| Silicon dioxide ($SiO_2$) | 50.45 |
| Cobalt oxide (CoO) | 1.05 |

Flux B is produced in a manner somewhat similar to flux A. For example, the different materials in flux B are initially mixed and then smelted at a temperature of approximately 2100° F. to melt all of the materials in the mixture. The melted mixture is then quenched as in water and is ground into relatively fine particles, such as particles having a size in the order of 400 mesh. When flux B is smelted as described above, it has a single melting temperature in the order of 1300° F.

Flux B may be formed from the following materials in the specified percentages by weight.

TABLE IV

| Material: | Relative percentage by weight |
|---|---|
| Lithium carbonate ($Li_2CO_3$) | 8.06 |
| Sodium carbonate ($Na_2CO_3$) | 19.40 |
| Aluminum trioxide ($Al_2O_3$) | 0.74 |
| Boric acid ($H_3BO_3$) | 19.10 |
| Titanium dioxide ($TiO_2$) | 2.60 |
| Silicon dioxide ($SiO_2$) | 49.00 |
| Cobalt oxide ($Co_3O_4$) | 1.10 |

As will be seen from Table I, the melting temperature of flux B should be higher than the melting temperature of flux A. One reason is that the oxide of sodium is included in flux B rather than the oxide of potassium as in flux A and that the relative percentage of the oxide of sodium in flux B is greater than the relative percentage of the oxide of potassium in flux A. The titanium dioxide is included in flux B to add refractory properties to the flux and to the resultant ceramic material and to inhibit the rate at which the flux remelts at the melting temperature. The oxide of boron is included in flux B as a glass former to reduce the melting temperature of the flux.

Since the carbonates of lithium and sodium are used as initial materials in flux B they become respectively converted to the oxides of lithium ($Li_2O$) and sodium ($Na_2O$) during the smelting operation. Boric acid also becomes converted to the oxide of boron ($B_2O_3$) by the removal of water from the boric acid during the smelting operation. The black cobalt oxide ($Co_3O_4$) becomes converted to cobalt oxide (CoO) when the material indicated in Table IV is smelted. This causes flux B to have the composition indicated in Table V after it has become smelted.

TABLE V

| Material: | Relative percentage by weight |
|---|---|
| Lithium oxide ($Li_2O$) | 4.1 |
| Sodium oxide ($Na_2O$) | 14.4 |
| Aluminum trioxide ($Al_2O_3$) | 1.0 |
| Boron oxide ($B_2O_3$) | 13.6 |
| Titanium dioxide ($TiO_2$) | 3.3 |
| Silicon dioxide ($SiO_2$) | 62.3 |
| Cobalt oxide (CoO) | 1.3 |

The ceramic material constituting this invention is produced by mixing fluxes A and B in the relative percentages of approximately fifty percent (50%) of each flux by weight. After fluxes A and B have been intimately mixed, the mixture is heated to an elevated temperature. Flux A melts at a temperature of approximately 1100° F. and tends to soften at temperatures approaching 1100° F. and to dig into the oxides of the metal with which it will be providing a hermetic seal. Flux A is further advantageous in that it provides an incipient action in inducing the melting of flux B which melts at a higher temperature than flux A. When flux B starts to melt, it enhances the gripping action of the resultant ceramic material with the oxide of the metal to which it is being chemically and mechanically adhered.

The ceramic material produced by the mixtures of fluxes A and B have a thermal coefficient of expansion approaching that of the metal such as stainless steel to which it will be bonded. The ceramic material is especially adapted to be bonded to stainless steel of the 400 series, but it may also be bonded to other types of stainless steel and to oxides such as those of iron, nickel and chromium. The thermal coefficient of expansion of the ceramic material constituting this invention is approximately $4.4 \times 10^{-6}$ inch/inch/deg. F. As previously described, the ceramic material provides a hermetic seal of approximately $1 \times 10^{-10}$ cubic centimeters of helium per second at both room temperatures of approximately 70° F. and elevated temperatures in the order of 1000° F. The electrical resistivity of the ceramic material is approximately $4 \times 10^{11}$ ohms/square centimeter at room temperature and is approximately $2 \times 10^6$ ohms/square centimeter at an elevated temperature of approximately 800° F.

The different oxides in the preferred embodiment of the ceramic material constituting this invention have the following percentages by weight:

TABLE VI

| Material: | Relative percentage by weight |
|---|---|
| Lithium oxide ($Li_2O$) | 2.20 |
| Potassium oxide ($K_2O$) | 2.55 |
| Sodium oxide ($Na_2O$) | 7.20 |
| Lead oxide (PbO) | 15.95 |
| Aluminum trioxide ($Al_2O_3$) | 0.90 |
| Boron oxide ($B_2O_3$) | 6.80 |
| Arsenic trioxide ($As_2O_3$) | 5.20 |
| Silicon dioxide ($SiO_2$) | 56.38 |
| Titanium dioxide ($TiO_2$) | 1.75 |
| Cobalt oxide (CoO) | 1.17 |

The different materials in flux A may be varied in relative weight in the flux in accordance with the table indicated below:

TABLE VII

| Material: | Range of relative percentages by weight |
|---|---|
| Lithium oxide ($Li_2O$) | 0–0.35 |
| Potassium oxide ($K_2O$) | 4.5–6.0 |
| Lead oxide (PbO) | 25.0–35.0 |
| Arsenic trioxide ($As_2O_3$) | 9.0–11.0 |
| Aluminum trioxide ($Al_2O_3$) | 0.5–1.0 |
| Silicon dioxide ($SiO_2$) | 45.0–55.0 |
| Cobalt oxide (CoO) | 0–2 |

The different materials in flux B may be varied in relative weight in the flux in accordance with the table indicated below:

TABLE VIII

| Material: | Range of relative percentages by weight |
|---|---|
| Lithium oxide ($Li_2O$) | 0–6.0 |
| Sodium oxide ($Na_2O$) | 10.0–18.0 |
| Aluminum trioxide ($Al_2O_3$) | 0.5–1.0 |
| Boron oxide ($B_2O_3$) | 10.0–15.0 |
| Titanium dioxide ($TiO_2$) | 1.0–4.0 |
| Silicon dioxide ($SiO_2$) | 55.0–67.0 |
| Cobalt oxide (CoO) | 0–2.0 |

As previously indicated, fluxes A and B are respectively mixed in a relative percentage of 50% by weight for each flux. The relative range of percentages by weight of the different oxides in the ceramic material constituting this invention are indicated below:

TABLE IX

| Material: | Range of relative percentages by weight |
|---|---|
| Lithium oxide ($Li_2O$) | 0–3 |
| Potassium oxide ($K_2O$) | 1–3 |
| Sodium oxide ($Na_2O$) | 5–9 |
| Lead oxide (PbO) | 10–10 |
| Aluminum trioxide ($Al_2O_3$) | 0.4–0.7 |
| Boron oxide ($B_2O_3$) | 5–10 |
| Arsenic trioxide ($As_2O_3$) | 4–8 |
| Silicon dioxide ($SiO_2$) | 46–66 |
| Titanium dioxide ($TiO_2$) | 1–2 |
| Cobalt oxide (CoO) | 0–2 |

This corresponds to a relative variation by weight of 25% to 75% for flux A and 25% to 75% for flux B.

It will be appreciated that substitutions may be made in the materials used in fluxes A and B and in the percentages of such materials by weight without departing from the scope of the invention. For example, the oxides of cerium and zirconium may be substituted for the oxide of titanium in flux B without departing from the scope of the invention. As another example, arsenic oxide ($As_2O_5$), arsenous acid $AsH_3$ or borax $$(Na_2B_4O7.10H_2O)$$

may be substituted for arsenous oxide. By way of further illustration, although red lead ($Pb_3O_4$) has been used because it liberates free oxygen, an equivalent amount of different forms of lead compounds such as litharge (PbO), white lead [$2PbCO_3.Pb(OH)_2$], lead monosilicate ($PbSiO_3$), lead bisilicate [$PbO.2(SiO_2)$] or lead trisilicate may be used. Because of this, claims setting forth ranges of elements are considered to include equivalent amounts of different forms of the same elements within the scope of the claims.

It will be seen from the above discussion and particularly from Table VI that the oxide of lead and the other glass modifiers including the oxide of potassium, the oxide of sodium, the oxide of lithium and the oxide of cobalt have a percentage by weight on a cumulative basis of approximately 29%. Similarly, the glass formers including the oxide of aluminum, the oxide of boron and the oxide of arsenic have a percentage by weight on a cumulative basis of approximately 13%. The oxide of silicon and the oxide of titanium have a percentage by weight on a cumulative basis of approximately 57%. It will also be seen from the above discussion that, since the oxide of lead has a percentage by weight of 16% in Table VI and all of the glass modifiers including the oxide of lead have a percentage by weight of approximately 29%, the additional glass modifiers of lithium, potassium, cobalt and sodium have a percentage by weight of approximately 13%.

I claim:

1. A ceramic material, consisting essentially of:
a first frit consisting of the following materials in the following range of percentages by weight:

| Material: | Range of relative percentages by weight |
|---|---|
| Lithium oxide ($Li_2O$) | 0–0.35 |
| Potassium oxide ($K_2O$) | 4.5–6.0 |
| Lead oxide (PbO) | 25.0–35.0 |
| Arsenic trioxide ($As_2O_3$) | 9.0–11.0 |
| Aluminum trioxide ($Al_2O_3$) | 0.5–1.0 |
| Silicon dioxide ($SiO_2$) | 45.0–55.0 |
| Cobalt oxide (CoO) | 0–2 | a second frit consisting of the following materials in the following range of percentages by weight:

| Material: | Range of relative percentages by weight |
|---|---|
| Lithium oxide ($Li_2O$) | 0–6.0 |
| Sodium oxide ($Na_2O$) | 10.0–18.0 |
| Aluminum trioxide ($Al_2O_3$) | 0.5–1.0 |
| Boron oxide $B_2O_3$) | 10.0–15.0 |
| Titanium dioxide ($TiO_2$) | 1.0–4.0 |
| Silicon dioxide ($SiO_2$) | 55.0–67.0 |
| Cobalt oxide (CoO) | 0–2.0 | each of the first and second frits having a relative percentage of 25% to 75% by weight.

2. A ceramic material, consisting essentially of:
lithium oxide having a relative percentage of approximately 2.2% by weight;
potassium oxide having a relative percentage of approximately 2.55% by weight;
sodium oxide having a relative percentage of approximately 7.2% by weight;
lead oxide having a relative percentage of approximately 15.95% by weight;
aluminum trioxide having a relative percentage of approximately 0.9% by weight;
boron oxide having a relative percentage of approximately 6.8% by weight;
arsenic trioxide having a relative percentage of approximately 5.2% by weight;
titanium dioxide having a relative percentage of approximately 1.75% by weight;
silicon dioxide having a relative percentage of approximately 56.38% by weight; and
cobalt oxide having a relative percentage of approximately 1.17% by weight.

3. A ceramic material having a thermal coefficient of expansion of approximately $4.4 \times 10^{-6}$ inch/inch/deg. F. and providing a hermetic seal of approximately $1 \times 10^{-10}$ cubic centimeters of helium per second at temperatures of approximately 70° F. and 1000° F. and having an electrical resistivity of approximately $4 \times 10^{11}$ ohms/square centimeter at room temperature and $2 \times 10^6$ ohms/square centimeter at approximately 800° F. and consisting of:
a first frit consisting of the following materials in the following approximate percentages by weight and having a melting temperature of approximately 1100° F.

| Material: | Relative percentages by weight |
|---|---|
| Lithium oxide | 0.30 |
| Potassium oxide | 5.10 |
| Lead oxide | 31.90 |
| Arsenic trioxide | 10.40 |
| Aluminum trioxide | 0.80 |
| Silicon dioxide | 50.45 |
| Cobalt oxide | 1.05 | a second frit consisting of materials in the following approximate percentages by weight and having a melting temperature of approximately 1300° F.:

| Material: | Relative percentages by weight |
|---|---|
| Lithium oxide | 4.1 |
| Sodium oxide | 14.4 |
| Aluminum trioxide | 1.0 |
| Boron oxide | 13.6 |
| Titanium dioxide | 3.3 |
| Silicon dioxide | 62.3 |
| Cobalt oxide | 1.3 | each of the first and second frits having a relative percentage of approximately 50% by weight.

References Cited

UNITED STATES PATENTS

| 2,907,665 | 10/1959 | Fraher | 106—49 |
| 2,949,376 | 8/1960 | Comer | 106—53 |
| 3,110,619 | 11/1963 | Koenig et al. | 106—49 |
| 3,184,320 | 5/1965 | Michael | 106—54 |
| 3,106,490 | 8/1963 | Earl | 106—53 |
| 2,844,693 | 7/1958 | Rieterink | 106—49 |

HELEN M. McCARTHY, Primary Examiner

106—54, 49, 39, 48